(12) United States Patent
Day (10) Patent No.: US 10,093,207 B2
(45) Date of Patent: Oct. 9, 2018

(54) RADIANT BARRIER FOR AUTOMOTIVE VEHICLE

(71) Applicant: Toyota Motor Engineering & Manufacturing North America, Inc., Erlanger, KY (US)

(72) Inventor: Robert Day, Northfield Township, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 175 days.

(21) Appl. No.: 15/216,010

(22) Filed: Jul. 21, 2016

(65) Prior Publication Data

US 2016/0325654 A1    Nov. 10, 2016

Related U.S. Application Data

(62) Division of application No. 14/259,706, filed on Apr. 23, 2014, now Pat. No. 9,434,325.

(51) Int. Cl.
*A47C 7/02* (2006.01)
*B60N 2/56* (2006.01)
*B60R 13/08* (2006.01)
*B60R 13/02* (2006.01)
*F28F 13/18* (2006.01)

(52) U.S. Cl.
CPC ............. *B60N 2/56* (2013.01); *B60N 2/5685* (2013.01); *B60R 13/0212* (2013.01); *B60R 13/0815* (2013.01); *F28F 13/18* (2013.01)

(58) Field of Classification Search
CPC . B60R 13/0815; B60R 13/0212; B60R 13/01; B60R 13/02; B60N 2/56; B60N 2/5685; B60N 2/7035; B60N 2/70; B60N 2/7017; B60N 2/5678; F28F 13/18; A47C 7/74
USPC ....... 296/39.3, 214, 39.1; 297/452.1, 452.48, 297/452.51
See application file for complete search history.

(56) References Cited

U.S. PATENT DOCUMENTS

| | | |
|---|---|---|
| 4,451,514 A | 5/1984 | Hunt |
| 4,986,343 A | 1/1991 | Sing |
| 5,064,714 A | 11/1991 | Yamaguchi et al. |
| 6,217,099 B1 | 4/2001 | McKinney et al. |
| 6,561,562 B1 | 5/2003 | Hesch |
| 6,669,265 B2 | 12/2003 | Tilton et al. |
| 6,877,786 B2 | 4/2005 | Gielda |
| 6,955,845 B1 | 10/2005 | Poole et al. |
| 7,243,972 B2 | 7/2007 | Ogawa et al. |
| 7,267,386 B2 | 9/2007 | Hesch |

(Continued)

*Primary Examiner* — Chi Q Nguyen
(74) *Attorney, Agent, or Firm* — Dinsmore & Shohl LLP (57) ABSTRACT

Embodiments of radiant barriers for vehicles are disclosed. According to one embodiment, a vehicle includes an interior cabin at least partially enclosed by a roof panel, a floor panel, and an engine compartment firewall, and a radiant barrier positioned within the interior cabin. The radiant barrier includes a first thermally reflective surface and a second thermally reflective surface opposite the first thermally reflective surface and separated from the first thermally reflective surface by a thickness t. The thickness t is constant along a length and a width of the radiant barrier. The radiant barrier at least partially thermally isolates the interior cabin from an external environment.

20 Claims, 4 Drawing Sheets

(56) References Cited

U.S. PATENT DOCUMENTS

| | | | |
|---|---|---|---|
| 7,980,358 B2 | 7/2011 | Soltau et al. | |
| 8,403,390 B2 | 3/2013 | Rich et al. | |
| 8,695,758 B2 | 4/2014 | Fushiki | |
| 9,434,325 B2 * | 9/2016 | Day | B60R 13/0815 |
| 2003/0062744 A1 | 4/2003 | Misaji et al. | |
| 2004/0107713 A1 * | 6/2004 | Aoki | B60H 1/00064 |
| | | | 62/208 |
| 2005/0188849 A1 * | 9/2005 | Yoneno | A47C 7/744 |
| | | | 96/143 |
| 2006/0202499 A1 | 9/2006 | Blomeling | |
| 2011/0017412 A1 | 1/2011 | Macneil | |
| 2011/0042988 A1 * | 2/2011 | Alpert | B60H 1/2218 |
| | | | 296/24.3 |
| 2011/0127246 A1 * | 6/2011 | Heiden | B60L 1/02 |
| | | | 219/202 |
| 2011/0167735 A1 | 7/2011 | Sumner | |
| 2013/0305647 A1 | 11/2013 | Naraghi | |
| 2016/0347217 A1 * | 12/2016 | Nishimura | B60N 2/5635 |

* cited by examiner

RADIANT BARRIER FOR AUTOMOTIVE VEHICLE

CROSS-REFERENCE TO RELATED APPLICATIONS

This application is a divisional of and claims the benefit of priority from U.S. Ser. No. 14/259,706, filed Apr. 23, 2014, now U.S. Pat. No. 9,434,325, the entire contents of which is incorporated herein by reference.

TECHNICAL FIELD

The present specification generally relates to radiant barriers for vehicles and, more specifically, radiant barriers for controlling the temperature within the interior cabin of a vehicle.

BACKGROUND

Vehicles consume energy in order to maintain a comfortable temperature inside the passenger cabin. Conventionally, heat transfer between the interior cabin of the vehicle and the external environment necessitates running the air conditioner or heater in order to maintain a comfortable temperature. For example, in the summer, maintaining a comfortable cabin temperature may require the air conditioner to be run nearly constantly to counteract the radiant heat from the sun incident on the roof of the vehicle and/or radiant heat from the pavement incident on the floor of the vehicle. In the winter, the heater may need to be run nearly constantly to replace heat lost through the vehicle roof. Additionally, some heat from a heated seat may be lost to the ambient environment of the vehicle instead of being directed onto the occupant of the seat.

Accordingly, a need exists for alternative structures and apparatuses for maintaining the temperature within the interior cabin of a vehicle.

SUMMARY

In one embodiment, a vehicle includes an interior cabin at least partially enclosed by a roof panel, a floor panel, and an engine compartment firewall, and a radiant barrier positioned within the interior cabin. The radiant barrier includes a substrate having a first thermally reflective surface on a first side of the substrate and a second thermally reflective surface on a second side of the substrate opposite the first side. The first thermally reflective surface and the second thermally reflective surface are separated by a thickness t of the substrate. The radiant barrier separates the interior cabin from at least one of the roof panel, the floor panel, and the engine compartment firewall, and at least partially thermally isolates the interior cabin from an external environment.

In another embodiment, a vehicle includes an interior cabin at least partially enclosed by a floor panel, a carpet positioned over an interior surface of the floor panel, and a radiant barrier positioned between the interior surface of the floor panel and the carpet. The radiant barrier includes a substrate having a first thermally reflective surface on a first side of the substrate and a second side of the substrate opposite the first side. The first thermally reflective surface and the second side are separated by a thickness t of the substrate. The radiant barrier at least partially thermally isolates the interior cabin from an external environment.

In yet another embodiment, a vehicle seat includes a seat frame, a pad supported by the seat frame, a heater element positioned over the pad, a radiant barrier, and a seat cover positioned over the heater element and at least partially enclosing the radiant barrier, the heater element, and the pad. The radiant barrier is positioned between the seat frame and the heater element and is a substrate having at least a first thermally reflective surface on a first side of the substrate. The first thermally reflective surface is positioned adjacent to the heater element. The radiant barrier thermally reflects at least some heat from the heater element towards the seat cover.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
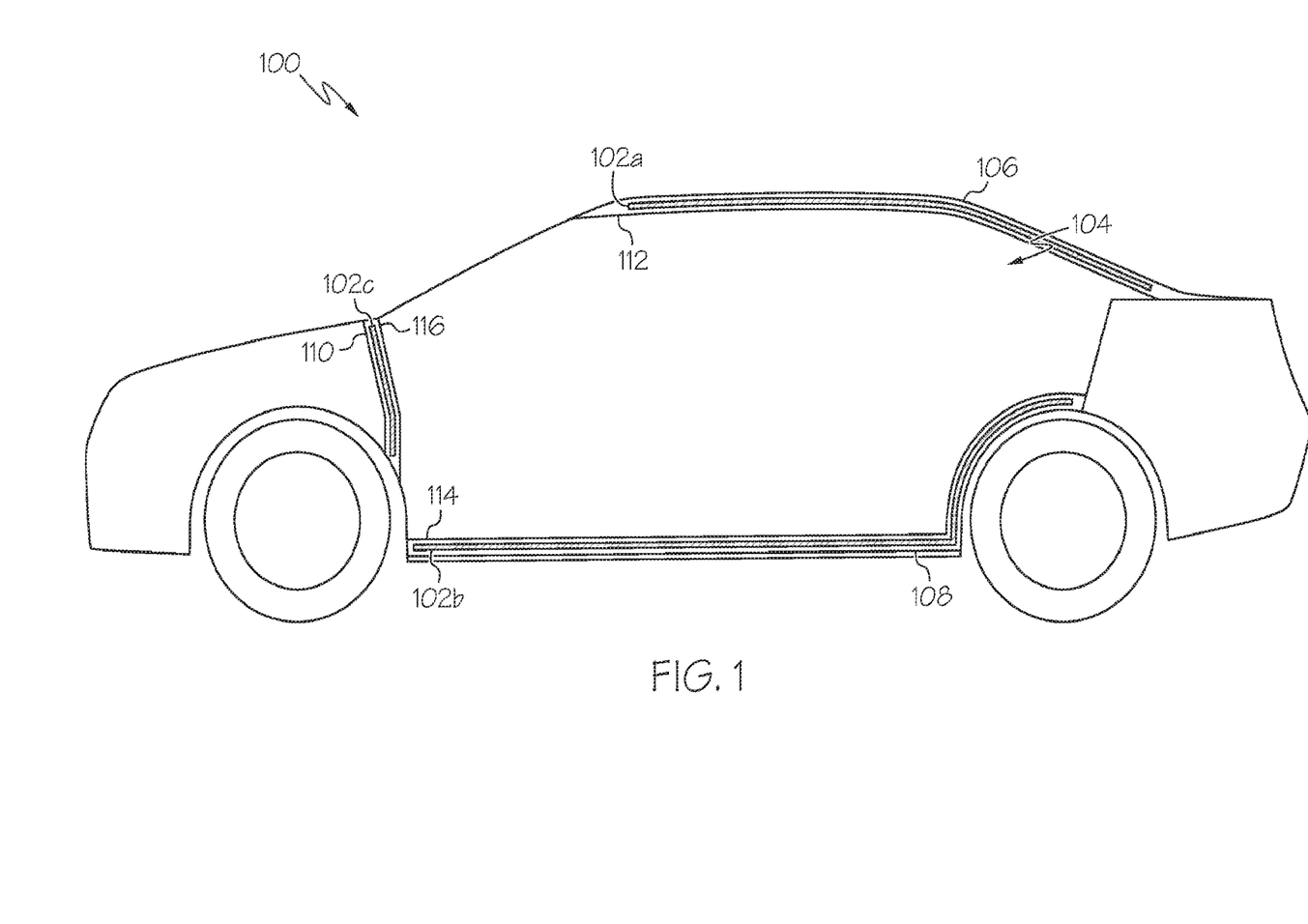
FIG. 1 schematically depicts a vehicle including radiant barriers positioned adjacent to a roof panel, a floor panel, and an engine compartment firewall, according to one or more embodiments shown and described herein.

FIG. 1 generally depicts one embodiment of a vehicle including one or more radiant barriers for thermally shielding the interior cabin of the vehicle from the external environment and thereby maintaining a temperature within the interior cabin of the vehicle. The vehicle is designated generally throughout by the reference numeral 100. In one embodiment, the vehicle generally includes an interior cabin that is at least partially enclosed by a roof panel and a floor panel. The vehicle also includes a radiant barrier that is positioned within the interior of the cabin to at least partially thermally isolate the interior cabin from the external environment. Various embodiments of vehicles with radiant barriers will be described in more detail herein with specific reference to the appended drawings.

Referring now to FIG. 1, a vehicle 100 is schematically depicted. The vehicle 100 includes at least one radiant barrier 102 for maintaining a temperature within an interior cabin 104 of the vehicle 100. The interior cabin 104 is at least partially enclosed from the external environment by a roof panel 106, a floor panel 108, and an engine compartment firewall 110. The at least one radiant barrier 102 is positioned within the interior cabin 104. As shown in FIG. 1, the vehicle 100 includes three radiant barriers, 102a, 102b, and 102c, although various embodiments may include a greater number or a fewer number of radiant barriers.

Figure 2:
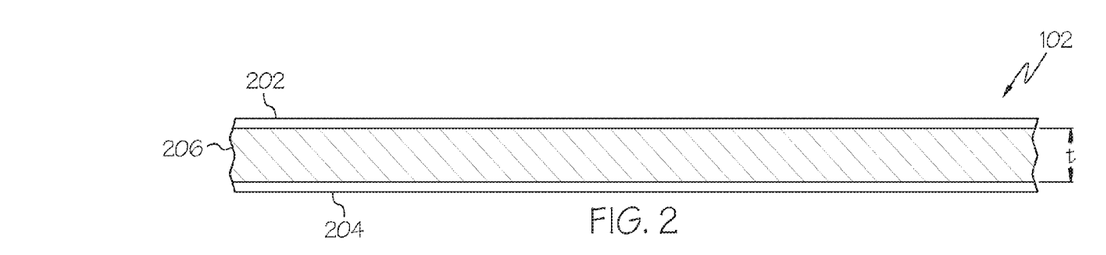
FIG. 2 schematically depicts an exemplary radiant barrier including a first thermally reflective surface and a second thermally reflective surface opposite the first thermally reflective surface and separated from the first thermally reflective surface by a thickness t, according to one or more embodiments shown and described herein.

Each radiant barrier 102a, 102b, 102c is a substrate that includes at least one thermally reflective surface for reflecting radiant heat either back into the interior cabin 104 or back into the external environment, depending on the particular embodiment and the orientation of the radiant barrier 102. As shown in FIG. 2, the radiant barrier 102a, 102b, 102c (collectively "radiant barrier 102" for purposes of FIGS. 2 and 3) includes two thermally reflective surfaces, the first thermally reflective surface 202 on a first side of a substrate 206 and a second thermally reflective surface 204 on a second side of the substrate 206, such that the radiant barrier 102 can reflect radiant heat both back into the interior cabin 104 and back into the external environment. The first and second thermally reflective surfaces are separated by a thickness t of the substrate 206. In various embodiments, the thickness t may be constant along a length and a width of the radiant barrier 102.

Figure 3:
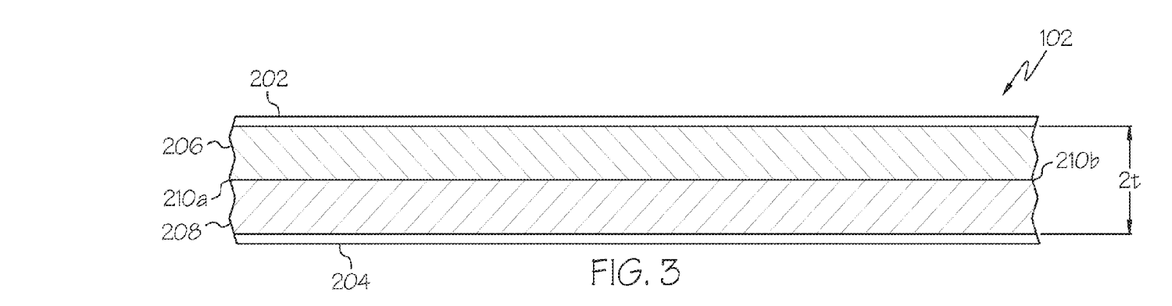
FIG. 3 schematically depicts another exemplary radiant barrier including a first substrate having a first thermally reflective surface and a second substrate having a second thermally reflective surface positioned adjacent to and in direct contact with one another such that the first thermally reflective surface and the second thermally reflective surface are opposite to one another and separated by a thickness t, according to one or more embodiments shown and described herein.

In some embodiments, such as the embodiment illustrated in FIG. 3, the first thermally reflective surface 202 may be a surface of a first substrate 206 and the second thermally reflective surface 204 may be a surface of a second substrate 208. Each of the first substrate 206 and the second substrate 208 includes a second side opposite the thermally reflective surface and can be positioned such that the second side of the first substrate 206 and the second side of the second substrate 208 are adjacent to and in direct contact with one another. In other words, the first substrate 206 can include the first thermally reflective surface 202 on a first side and a second side 210a opposite the thermally reflective surface 202 and the second substrate 208 can include the second thermally reflective surface 204 on a first side and a second side 210b opposite the second thermally reflective surface 204, and the first and second substrates 206 and 208 can be positioned such that the second side 210a of the first substrate 206 is in direct contact with and adjacent to the second surface 210b of the second substrate 208. In these embodiments, the first and second substrates 206 and 208 may be adhered to one another via a bonding layer, such as an adhesive layer or the like, between the second side 210a of the first substrate 206 and the second side 210b of the second substrate 208. In embodiments, the thickness 2t between the first and second thermally reflective surfaces 202 and 204 is constant over the length and width of the radiant barrier 102. For example, the radiant barrier 102 can include two sheets of thermally reflective material that are positioned directly adjacent to one another along the length and width of the sheets, as shown in FIG. 3, with each sheet having at least one thermally reflective surface.

In embodiments, the radiant barrier 102 can be constructed from a flexible metalized plastic material, such as metalized polyester or the like. Suitable materials include, without limitation, materials available as space blankets and aluminized Mylar®. However, it should be understood that other suitable materials may be used.

Referring again to FIG. 1, the radiant barriers 102a, 102b, and 102c are positioned within the interior cabin 104 and generally separate the interior cabin 104 from at least a portion of the roof panel 106, at least a portion of the floor panel 108, and at least a portion of the engine compartment firewall 110, respectively. While the roof panel 106, floor panel 108, and engine compartment firewall 110 physically separate the interior cabin 104 from the external environment, radiant heat, such as heat radiating from the sun, the pavement, and/or the engine compartment, or heat radiating from the interior cabin 104, can pass through the roof panel 106, floor panel 108, and engine compartment firewall 110, thereby causing the temperature of the interior cabin 104 to change. For example, heat radiating from the sun can pass through the roof panel 106 and cause the temperature of the interior cabin 104 to rise, which may be undesirable during the summer. An undesirable increase in temperature can also result from heat radiating from the pavement through the floor panel 108 or heat radiating from the engine compartment through the engine compartment firewall 110. As another example, heat generated by the heater may radiate out through the roof panel 106, floor panel 108, and/or engine compartment firewall 110 during the winter, causing the temperature of the interior cabin 104 to decrease, which may be undesirable during the winter. In the embodiments described herein, the radiant barriers 102a, 102b, 102c can at least partially thermally isolate the interior cabin 104 from the external environment by reflecting radiant heat back in the direction from which it came, thereby mitigating temperature fluctuations within the interior cabin 104.

For instance, the radiant barrier 102a may include a thermally reflective surface oriented towards and positioned adjacent to an interior surface of the roof panel 106. The thermally reflective surface reflects radiant heat back toward the roof panel 106 and away from the interior cabin 104, at least partially reducing the heat transmitted to the interior cabin 104 through the roof panel 106. As used herein, the phrase "interior surface" corresponds to a surface directed towards (i.e., facing) the interior cabin 104. In various embodiments, the radiant barrier 102a also includes a thermally reflective surface directed towards the interior cabin 104 that reflects radiant heat back into the interior cabin 104, at least partially mitigating heat lost to the external environment through the roof panel 106.

Similarly, the radiant barrier 102b includes a thermally reflective surface directed towards and positioned adjacent to an interior surface of the floor panel 108. The thermally reflective surface reflects radiant heat back toward the floor panel 108 and away from the interior cabin 104, at least partially reducing the heat transmitted to the interior cabin 104 through the floor panel 108. In some embodiments, the radiant barrier 102b also includes a thermally reflective surface directed towards the interior cabin 104 that reflects radiant heat back into the interior cabin 104, at least partially mitigating heat lost to the external environment through the floor panel 108.

Radiant barrier 102c includes a thermally reflective surface directed towards and positioned adjacent to an interior surface of the engine compartment firewall 110. The thermally reflective surface reflects radiant heat back toward the engine compartment firewall 110 and away from the interior cabin 104, at least partially reducing the heat transmitted to the interior cabin 104 through the engine compartment firewall 110. In various embodiments, the radiant barrier 102c also includes a thermally reflective surface directed towards the interior cabin 104 that reflects radiant heat back into the interior cabin 104, at least partially mitigating heat lost to the external environment through the engine compartment firewall 110.

In some embodiments described herein, the radiant barriers may be incorporated in a trim piece of the vehicle positioned within the interior cabin of the vehicle. Various trim pieces are depicted in FIG. 1. For example, the vehicle 100 may include a headliner 112, a carpet 114, and an instrument panel 116. As shown in FIG. 1, the radiant barrier 102a is positioned between at least a portion of the headliner 112 and the roof panel 106. The radiant barrier 102b is positioned between at least a portion of the carpet 114 and the floor panel 108. The radiant barrier 102c is positioned between at least a portion of the instrument panel 116 and the engine compartment firewall 110. In some embodiments, the radiant barriers 102a, 102b, and 102c are positioned between the entirety of the headliner 112 and the roof panel 106, the entirety of the carpet 114 and the floor panel 108, and the entirety of the instrument panel 116 and the engine compartment firewall 110, respectively.

However, in other embodiments, the radiant barriers may be positioned between only a portion of the trim piece and the corresponding panel. For example, in some embodiments, the radiant barrier 102a may be positioned between only a portion of the headliner 112 and the roof panel 106. Similarly, the radiant barrier 102b may be positioned between only a portion of the carpet 114 and the floor panel 108. The radiant barrier 102c may be positioned between only a portion of the instrument panel 116 and the engine compartment firewall 110. As used herein, the phrase "positioned between only a portion of" includes one or both of a portion of an area of the headliner, the carpet, or the instrument panel and a portion of the thickness of the headliner, the carpet, or the instrument panel. For example, a radiant barrier positioned between a portion of the headliner and the roof panel may extend across the entire area between the headliner and the roof panel (side to side and front to back), but may be incorporated into the headliner as a layer of the composite making up the headliner, as described in greater detail below, such that the radiant barrier is positioned between the roof panel and at least a portion of a thickness of the headliner. As another example, a radiant barrier positioned between a portion of the carpet and the floor panel may be a distinct layer between the carpet and the floor panel (e.g., not incorporated into either one of the carpet of the floor panel), but may cover only a portion of the area of the carpet, such as a portion of the area of the carpet in the front of the interior cabin (e.g., where the feet of passengers riding in the front of the vehicle are positioned) and/or a portion of the area of the carpet in the rear of the interior cabin (e.g., where the feet of passengers riding in the rear of the vehicle are positioned) such that the radiant barrier is positioned between the floor panel and at least a portion of an area of the carpet, as described in greater detail below. Alternatively, the radiant barrier can be directly incorporated into the carpet such that the radiant barrier is positioned between the floor panel and at least a portion of the thickness of the carpet. Thus, the manufacturer can reduce costs associated with installing the radiant barrier in the vehicle by incorporating the radiant barrier in locations more prone to heat transfer while not covering the entire surface area of the interior cabin with the radiant barrier.

In some embodiments, at least one thermally reflective surface of one or more of the radiant barriers 102a, 102b, and/or 102c can be positioned directly adjacent to an interior surface of the roof panel 106, an interior surface of the floor panel 108, and an interior surface of the engine compartment firewall 110, respectively. In other words, in these embodiments, the thermally reflective surface of the radiant barrier 102a, 102b, 102c directly contacts the interior surface without any intervening material, such as an additional thermal barrier, insulation, or the like. In other embodiments, an adhesive layer can be positioned between the thermally reflective surface of the radiant barrier 102a, 102b, 102c, and the interior surface of the roof panel 106, the interior surface of the floor panel 108 and/or the interior surface of the engine compartment firewall 110. The adhesive layer can cover the entire area between the thermally reflective surface of the radiant barrier 102a, 102b, 102c and the interior surface of the roof panel 106, an interior surface of the floor panel 108 and/or an interior surface of the engine compartment firewall 110 (e.g., the adhesive layer may be a continuous layer), or the adhesive layer can be located in only specific areas, such as, for example around the edges of the radiant barrier and/or in a discontinuous pattern.

In other embodiments, the radiant barrier 102a, 102b, 102c can be adhered to the headliner 112, the carpet 114, and/or the instrument panel 116, respectively. For example, the radiant barrier 102a positioned between the headliner 112 and the roof panel 106 can be adhered to an external surface (i.e., the surface opposite the surface exposed to the interior cabin) of the headliner 112. Similarly, the radiant barrier 102b positioned between the carpet 114 and the floor panel 108 can be adhered to an external surface of the carpet 114 (i.e., the surface opposite the surface exposed to the interior cabin). The radiant barrier 102c positioned between the instrument panel 116 and the engine compartment firewall 110 can be adhered to an external surface (i.e., the surface opposite the surface exposed to the interior cabin) of the instrument panel. As used herein, the term "external surface" refers to a surface of the headliner, carpet and/or trim panel directed towards (i.e., facing) the corresponding body panel.

While the radiant barriers 102a, 102b, 102c have been described herein as being secured by adhesive, it should be understood that other techniques for securing the radiant barriers may also be used. For example, the radiant barrier can be clipped, tacked, screwed, pinned, or otherwise secured to at least one adjacent surface.

Figure 4:
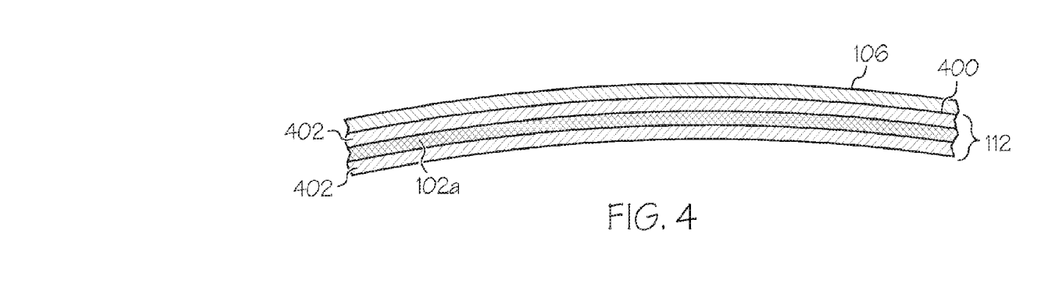
FIG. 4 schematically depicts a radiant barrier incorporated into layers of a headliner and positioned adjacent to a roof panel according to one or more embodiments shown and described herein.

As mentioned above, in some embodiments, the radiant barrier 102a can be positioned between a portion of the thickness of the headliner 112 and an interior surface 400 of the roof panel 106, with a portion of the headliner 112 between the radiant barrier 102a and the roof panel 106. As illustrated in FIG. 4, the headliner 112 can be formed as a composite of a plurality of layers 402. The layers 402 are pressed and/or adhered together to form the headliner 112. Each of the layers 402 can include one or more materials including, but not limited to, a fabric, a nonwoven backing, a woven backing, a foam backing, a foam, and the like. For example, a headliner 112 can be a composite which includes a fabric layer, a foam backing layer, and a polyurethane foam layer.

In some embodiments, the radiant barrier 102a can be included within the composite as one of the plurality of layers, either between two of the plurality of layers 402, as shown in FIG. 4, or as a layer directly adjacent to the interior surface 400 of the roof panel 106 with no other layers disposed between the radiant barrier 102a and the interior surface 400 of the roof panel 106. For example, the radiant barrier 102a can be positioned between the fabric layer and the foam backing layer, or the radiant barrier 102a can be positioned between two foam backing layers. As another example, the radiant barrier 102a can be a layer external to the foam backing layer, adjacent to the interior surface 400 of the roof panel 106. Regardless of where the radiant barrier 102a is positioned within the layered structure of the headliner 112, the headliner 112 may be glued, bonded, pinned, clipped, tacked, screwed, adhered or otherwise secured in position within the interior cabin 104.

In some embodiments, each layer, including the layers 402 of the headliner 112, the radiant barrier 102a, and the roof panel 106 are adhered to one another such that there are substantially no air pockets between the layers. In other words, although the layers may not form an air-tight seal between the interior cabin 104 and the external environment, each of the headliner 112, radiant barrier 102a, and the roof panel 106 are positioned such that there is substantial contact between directly adjacent surfaces, as illustrated in FIG. 4.

In some embodiments, the radiant barrier 102 can be molded in place such that the radiant barrier 102 substantially conforms to the shape of an adjacent surface and cannot slide or move out of place. For example, the radiant barrier 102b may be molded in place along with the carpet 114. When the radiant barrier 102b is molded in place, it takes the shape of the floor and/or the carpet 114, and is unable to slide between the carpet 114 and the floor panel 108. The radiant barrier 102b can be molded in place as a layer separate from the carpet 114, or it can be molded into the carpet 114, depending on the specific embodiment. Additionally, the molding in place of the radiant barrier 102b and the carpet 114 can be a single process or process step, or each of the radiant barrier 102b and the carpet 114 can be molded in place during separate process steps or separate processes.

In some embodiments, the radiant barrier 102b can be included as part of the carpet 114. For example, the carpet 114 can include a top layer and a backing layer. The radiant barrier 102b can be positioned between the top layer and a backing layer, or the radiant barrier 102b can be adhered to the carpet 114 such that the backing layer is positioned between the top layer and the radiant barrier 102b.

Although various embodiments described above include a radiant barrier positioned between at least one of a roof panel and a headliner, a floor panel and a carpet, and an engine compartment firewall and an instrument panel, radiant barriers can be incorporated elsewhere within the interior cabin in order to provide energy savings while maintaining a temperature within the interior cabin. Embodiments in which a radiant barrier is included in a seat will now be described.

Figure 5:
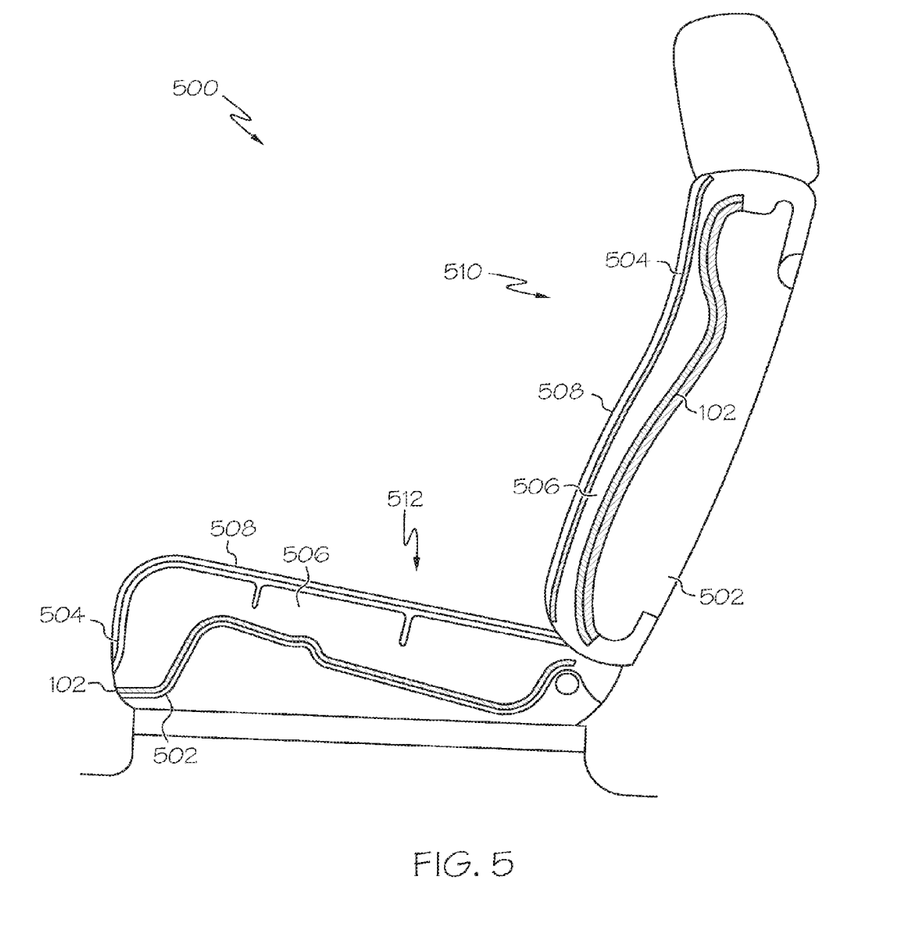
FIG. 5 schematically depicts a side view of a vehicle seat including a radiant barrier according to one or more embodiments shown and described herein.

Referring now to FIG. 5, FIG. 5 depicts an embodiment of a vehicle seat 500 including a radiant barrier 102 positioned in at least one of the seat portion 512 of the vehicle seat and the back portion 510 of the vehicle seat. The radiant barrier 102 is positioned between a seat frame 502 and a heater element 504. The vehicle seat 500 further includes a pad 506 supported by the seat frame 502. The heater element 504 is positioned over the pad 506. A seat cover 508 at least partially encloses at least the radiant barrier 102, the heater element 504, and the pad 506. In some embodiments, the seat cover 508 can additionally enclose part or all of the seat frame 502 such that the seat frame 502 is not visible within the interior cabin.

Heater element 504 can be a conventional heater element commonly used for vehicular seat heat heaters. For example, the heater element 504 can be one or more resistive heaters molded or otherwise attached to a fabric layer and configured to provide heat to the vehicle seat 500. At least some of the heat provided to the vehicle seat 500 is radiant heat which radiates out from the resistive heaters. The heater element 504 provides heat in a plurality of directions. For example, the heater element 504 provides heat to the pad 506 located below the heater element 504 and to the seat cover 508 located above the heater element 504, as shown in FIG. 5. However, when the radiant barrier 102 is positioned between the seat frame 502 and the heater element 504, at least some of the heat radiated below the heater element 504 (e.g., not in the direction of the seat cover 508) is reflected back towards the heater element 504 and the seat cover 508. Thus, a greater amount of heat (e.g., a greater percentage of the total heat provided by the heater element 504) is provided in the direction of the seat cover 508 without increasing energy consumption. For example, the use of a radiant barrier 102 in the vehicle seat 500 can reduce or even eliminate the need for more powerful heater elements and/or a greater number of heater elements, and can lead to a reduced operating time and/or operating power of the heater element 504, thereby prolonging the life of the heater element 504.

As above, the radiant barrier 102 includes a substrate having at least one thermally reflective surface on a side of the substrate. The thermally reflective surface of the radiant barrier 102 is positioned adjacent to the heater element 504 such that the radiant barrier 102 thermally reflects at least some heat provided by the heater element 504 towards the seat cover 508. The thermally reflective surface of the radiant barrier 102 can be positioned directly adjacent to the heater element 504 (e.g., no intervening material between the thermally reflective surface and the heater element 504), or the thermally reflective surface of the radiant barrier 102 can be positioned between at least a portion of the pad 506 and the heater element 504, directed towards the heater element 504. As above, in some embodiments, the substrate of the radiant barrier 102 also includes a second thermally reflective surface on a second side of the substrate opposite the first side. The first thermally reflective surface and the second thermally reflective surface are separated by a thickness t of the substrate. In some embodiments, the thickness t is constant along a length and width of the radiant barrier 102.

In some embodiments, a portion of the pad 506 is positioned between the radiant barrier 102 and the heater element 504. For example, the radiant barrier 102 can be molded into the pad 506 such that at least a portion of the pad 506 is between the radiant barrier 102 and the heater element 504 and a portion of the pad 506 is between the radiant barrier 102 and the seat frame 502. As another example, the radiant barrier 102 can be positioned between the pad 506 and the seat frame 502. The radiant barrier 102 may alternatively be positioned between heater element 504 and the pad 506.

The radiant barrier 102 can be molded into the pad 506, as described above, or it can be a separate piece. For example, the radiant barrier 102 can be a substrate that is separate from the pad 506 such that a vehicle manufacturer can use the same type of pad 506 for a variety of vehicles and trim levels, some of which include the radiant barrier 102 and some of which do not.

Figure 6:
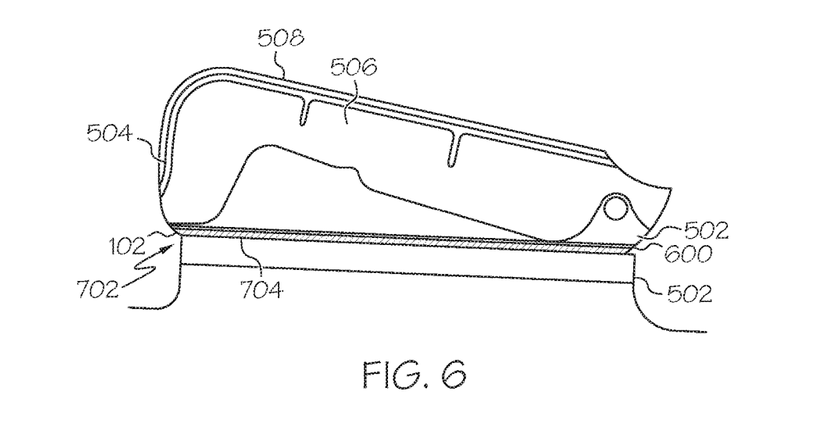
FIG. 6 schematically depicts a side view of a vehicle seat including a radiant barrier according to one or more embodiments shown and described herein.

In another embodiment, the radiant barrier 102 can be incorporated into a tray 702 configured to slide into and out of the vehicle seat 500. For example, the radiant barrier 102 can be attached to a plastic or foam member that is appropriately sized to be received into a corresponding slot 704 in the vehicle seat 500. In some embodiments, such as the embodiment illustrated in FIG. 6, the seat frame 502 can be configured to receive the radiant barrier 102. As shown in FIG. 6, the radiant barrier 102 can be slid into a corresponding slot 704 within the seat frame 502. In such embodiments, the radiant barrier 102 can be removed and reversed by a vehicle operator. For example, the radiant barrier 102 can include only a single thermally reflective surface 600 positioned on an exterior surface of the tray 702. In the winter, the vehicle operator can position the radiant barrier 102 such that the thermally reflective surface is adjacent to the pad 506 and the heater element 504 in order to reflect the radiant heat from the heater element 504 toward an occupant in the seat, as illustrated in FIG. 6. However, in the summer, the vehicle operator can remove and reverse the tray 702 including the radiant barrier 102 such that the single thermally reflective surface 600 is directed toward the floor of the vehicle in order to reflect radiant heat from the floor of the vehicle away from an occupant in the seat, as shown in FIG. 7.

Figure 7:
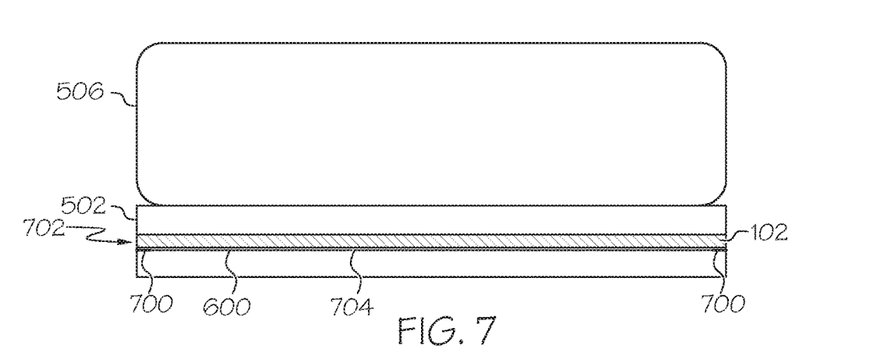
FIG. 7 schematically depicts a front view of the vehicle seat shown in FIG. 6 according to one or more embodiments shown and described herein.

FIG. 7 is a front view of the seat shown in FIG. 6. As shown in FIG. 7, the radiant barrier 102 can be supported by the seat frame 502 beneath the pad 506 by tray support members 700. The tray support members 700 can be formed integrally with the seat frame 502 and enable the radiant barrier 102 to be easily inserted and removed. In some embodiments, the radiant barrier 102 can include a push-release, causing the radiant barrier 102 to be at least partially ejected from the seat frame 502 when a vehicle operator pushes on it. In addition or as an alternative, a door or other cosmetic embellishment can be incorporated to conceal the radiant barrier 102 from view.

Referring again to FIG. 5, the vehicle seat 500 is illustrated as further including a heater element 504 and a radiant barrier 102 in the back portion 510 of the vehicle seat 500 in addition to the seat portion 512 of the vehicle seat 500. It is contemplated that various embodiments may or may not include a heater element and/or a radiant barrier 102 in the back portion 510 of the vehicle seat 500.

Similarly, although specific reference has been made to the figures herein which include a radiant barriers 102a, 102b, 102c adjacent to a roof panel 106, a floor panel 108 and an engine compartment firewall 110, it is specifically contemplated that some embodiments may include a radiant barrier in only some of these positions. For example, a vehicle can include the radiant barrier 102a positioned adjacent to the roof panel 106, but not include the radiant barrier 102b or the radiant barrier 102c. Similarly, a vehicle can include the radiant barrier 102b positioned adjacent to the floor panel 108, but not include the radiant barrier 102a or the radiant barrier 102c. Likewise, a vehicle can include the radiant barrier 102a positioned adjacent to the roof panel 106 and the radiant barrier 102b positioned adjacent to the floor panel 108, but not include the radiant barrier 102c. These combinations are merely exemplary and it is to be understood that other combinations are contemplated within the scope of this disclosure.

Moreover, embodiments in which a radiant barrier 102 is incorporated into a vehicle seat 500 can be combined with any of the foregoing, or may be implemented without including other radiant barriers within the interior cabin 104. For example, a vehicle can include one or more of the radiant barriers 102a, 102b, and 102c in addition to including a radiant barrier 102 within the vehicle seat 500. Alternatively, a vehicle can include a radiant barrier 102 incorporated into only the vehicle seat 500 and not include the radiant barriers 102a, 102b, and/or 102c.

Although various embodiments described herein incorporate one or more radiant barriers such that the radiant barrier is incorporated into the vehicle during manufacture, it is also contemplated that a radiant barrier can be incorporated as an after-market product or is otherwise not incorporated into the vehicle during the manufacturing process. For example, a radiant barrier can be incorporated into one or more floor mats. In such embodiments, the radiant barrier can be oriented such that a thermally reflective surface of the radiant barrier is directed towards the floor of the vehicle in order to reflect radiant heat entering the interior cabin of the vehicle through the floor back towards the external environment. Incorporation of the radiant barrier into the floor mats can provide a low-cost alternative to inclusion of the radiant barrier between the carpet and the floor panel, and can enable a vehicle owner to employ the technology in an older-model vehicle. As with previously described embodiments, the radiant barrier can be incorporated into the material of the floor mat, can be a layer within the floor mat, or can be a distinct substrate positioned between the floor mat and the carpet of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle seat comprising:
   a seat frame;
   a pad supported by the seat frame;
   a heater element positioned over the pad;
   a radiant barrier positioned between the seat frame and the heater element, the radiant barrier comprising a substrate having at least a first thermally reflective surface on a first side of the substrate, the first thermally reflective surface positioned adjacent to the heater element; and
   a seat cover positioned over the heater element and at least partially enclosing the radiant barrier, the heater element, and the pad, wherein the radiant barrier thermally reflects at least some heat from the heater element towards the seat cover.

2. The vehicle seat of claim 1, wherein the radiant barrier is positioned between at least a portion of the pad and the heater element.

3. The vehicle seat of claim 2, wherein the radiant barrier is disposed within the pad with at least a portion of the pad between the radiant barrier and the seat frame.

4. The vehicle seat of claim 1, wherein the substrate further comprises a second thermally reflective surface on a second side of the substrate, wherein the first thermally reflective surface and the second thermally reflective surface are separated by a thickness t of the substrate, and wherein the thickness t is constant along a length and a width of the radiant barrier.

5. The vehicle seat of claim 1, wherein the radiant barrier is positioned directly adjacent to the heater element.

6. The vehicle seat of claim 1, wherein the radiant barrier is positioned between the seat frame and the pad.

7. The vehicle seat of claim 1, wherein the radiant barrier is positioned between the heater element and the pad.

8. The vehicle seat of claim 1, wherein the radiant barrier is incorporated into a tray configured to slide into and out of the vehicle seat.

9. The vehicle seat of claim 8, wherein the seat frame comprises a slot configured to receive the tray.

10. The vehicle seat of claim 1, wherein the vehicle seat comprises a seat portion and a back portion.

11. The vehicle seat of claim 10, wherein the radiant barrier is positioned within the seat portion of the vehicle seat.

12. The vehicle seat of claim 10, wherein the radiant barrier is positioned within the back portion of the vehicle seat.

13. A vehicle comprising:
at least one vehicle seat, the vehicle seat comprising:
a seat frame;
a pad supported by the seat frame;
a heater element positioned over the pad;
a radiant barrier positioned between the seat frame and the heater element, the radiant barrier comprising a substrate having at least a first thermally reflective surface on a first side of the substrate, the first thermally reflective surface positioned adjacent to the heater element; and
a seat cover positioned over the heater element and at least partially enclosing the radiant barrier, the heater element, and the pad, wherein the radiant barrier thermally reflects at least some heat from the heater element towards the seat cover.

14. The vehicle of claim 13, wherein the radiant barrier is positioned between at least a portion of the pad and the heater element.

15. The vehicle of claim 14, wherein the radiant barrier is disposed within the pad with at least a portion of the pad between the radiant barrier and the seat frame.

16. The vehicle of claim 13, wherein the substrate further comprises a second thermally reflective surface on a second side of the substrate, wherein the first thermally reflective surface and the second thermally reflective surface are separated by a thickness t of the substrate, and wherein the thickness t is constant along a length and a width of the radiant barrier.

17. The vehicle of claim 13, wherein the radiant barrier is positioned directly adjacent to the heater element.

18. The vehicle of claim 13, wherein the radiant barrier is positioned between the seat frame and the pad.

19. The vehicle of claim 13, wherein the radiant barrier is positioned between the heater element and the pad.

20. The vehicle of claim 13, wherein the radiant barrier is incorporated into a tray configured to slide into and out of the vehicle seat.

* * * * *